July 8, 1947.  A. F. RATZER  2,423,618
FIRE-FOAM PRODUCING APPARATUS
Filed Aug. 19, 1944
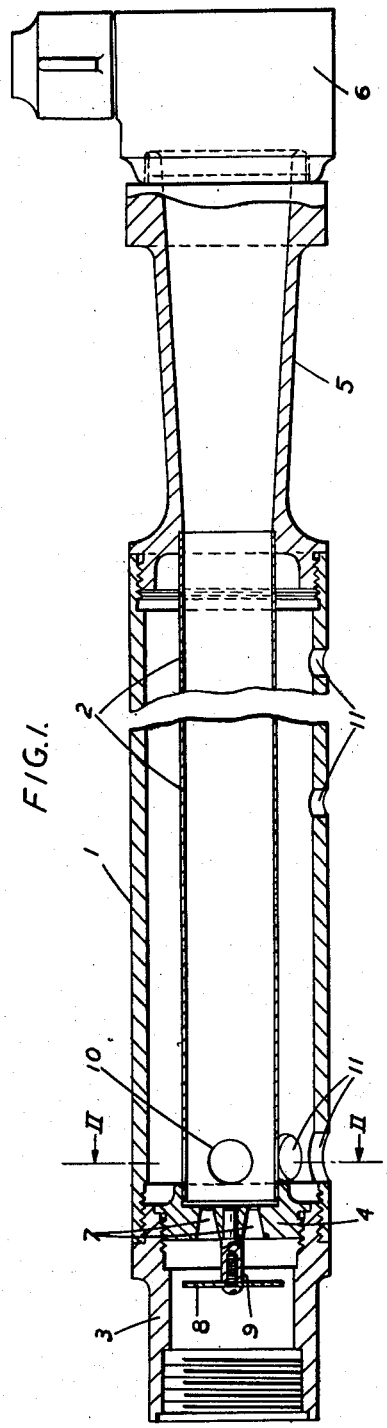
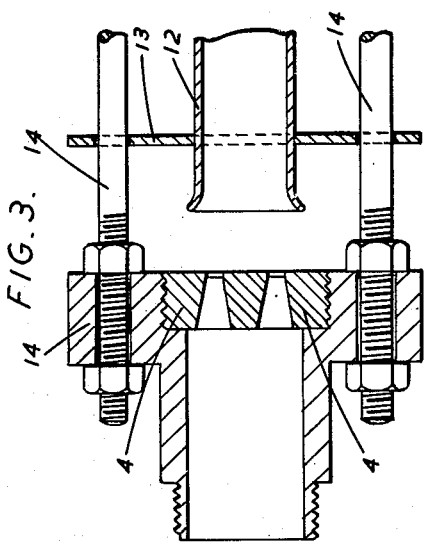
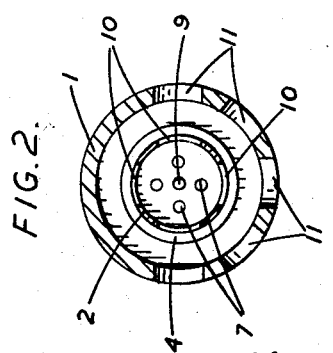
Inventor
Arthur F. Ratzer
By
H. C. Diesem
Attorney Patented July 8, 1947

2,423,618

UNITED STATES PATENT OFFICE 2,423,618

FIRE-FOAM PRODUCING APPARATUS

Arthur Ferdinand Ratzer, Brentford, England, assignor to The Pyrene Company Limited, Brentford, England, a British company Application August 19, 1944, Serial No. 550,207
In Great Britain September 2, 1943

5 Claims. (Cl. 261—116)

One of the most successful methods of producing foam for fire-extinguishing purposes consists in intimately mixing together water, a foam-stabilising compound and air, so as to produce what is commonly known as air foam. This is a mechanical process as distinguished from chemical processes in which chemical reaction takes place with evolution of gas.

One general form of apparatus for the production of air foam involves the entrainment of air by liquid under pressure. Suitable apparatus working on this principle is disclosed in the patent to Wagener No. 1,821,914, granted September 1, 1931, and in the patents to Friedrich Nos. 2,003,184, 2,073,204 and 2,086,711. In this apparatus a number of intersecting jets of liquid are used, the jets breaking up when they intersect and serving to trap the air. Although this intersection is very effective in forming foam, the apparatus cannot be used for some purposes; in particular it will not produce air foam with an adequate degree of expansion for extinguishing purposes and under a sufficient pressure to enable the foam either to be driven up a riser pipe on the side of an oil tank, which may be as much as 45 feet high, or to be delivered into the bottom of such a tank against the pressure of the oil in it. Such an apparatus will also not deliver foam through a considerable length of a pipe system or a fire hose and still cause the foam to emerge with sufficient energy to form a fire-fighting jet.

I have now observed that when the liquid is under the high pressure necessary for forcing purposes, i. e. at least 100 lbs. per square inch, a large proportion of the energy available is wasted at the intersection of the jets. According to the present invention I use two or more substantially parallel (i. e. non-intersecting) jets which discharge into an unobstructed open end of a parallel-sided or slightly flaring tube into which the air is entrained at or close to that end. I find that in this way I can produce foam which after overcoming considerable resistance is of remarkable quality, although there is some loss of expansion, that is to say, the volume of foam produced from a given volume of liquid is not so great, but this is compensated by the improvement in the quality, and thus the fire-extinguishing properties, of the foam. The air is actually induced by the pressure difference or ejector action as before. I find that if liquid under high pressure is delivered through smooth-bored orifices it is liable to emerge as powerful rod-like jets, which fail to entrain the air in the necessary state of sub-division. It is necessary that the jets should scatter at the fringes without intersecting bodily if the desired result is to be obtained and to ensure enough scattering at the fringes some turbulence must be imparted to the water. This can be done in various ways, e. g. by roughening the surfaces of the jet orifices, by providing a baffle in the path of the liquid that is delivered to the orifices or by causing that liquid to pass through a wide-meshed filter. Naturally there must be some spreading of the fringe of one jet into the next, but as the jets do not intersect as a whole, that is to say, do not impinge on one another, the energy wasted is small, so that the apparatus has considerable forcing power.

The jets must occupy the whole cross-section of the tube over part of its length and as they spread only by fringe scattering the tube is preferably parallel-sided, but it may flare outwards slightly. However, if the wall of the tube makes as large an angle as 15° to the axis the cross-section of the tube is not adequately filled by the scattering of the jets and the desired result is not obtained.

The jets are, of course, formed by dividing a stream of liquid under pressure and it is essential that the liquid in each jet should maintain a substantial part of the forward velocity of the original stream. It follows that that stream must not be broken up into too many jets and that the jets must not be too small in diameter. It is most convenient to use an orifice plate and the size of the orifices in this is largely a matter of convenience, subject to the considerations just mentioned. In general, orifices between 1/8 and 1/2 inch in diameter may be used. Jets produced by orifices less than 1/8 inch in diameter tend to lose their forward velocity too quickly, and in those produced by orifices over 1/2 inch in diameter it is difficult to obtain the required turbulence. As an example, if the liquid is to be supplied at the rate of 15 gallons per minute under a pressure of 150 lbs. per square inch, three orifices 1/8 inch in diameter may be used. If much more foam is required, e. g. if the liquid is supplied at the rate of 200 gallons per minute, three orifices 1/2 inch in diameter or 12 orifices 1/4 inch in diameter may be used.

Since the liquid must wholly occupy the parallel-sided tube over part of the length of the latter the amount of air that is entrained is necessarily limited. It is, however, important to ensure that an appropriate amount of air is entrained, because if there is too much air some of the energy of the liquid is lost in entraining it.

On the other hand, if there is too little air, insufficient foam is produced. The volume of air entrained depends on the area available for it in the tube, and accordingly the ratio of the cross-sectional area of the tube to the total cross-sectional area of the jets as they enter the tube is maintained between 5:1 and 15:1. Preferably this ratio lies between 8:1 and 12:1.

The length of the parallel-sided tube is another factor that must be taken into account in order to produce the desired result. The tube must be long enough to ensure that the liquid will fill the tube and have an adequate distance over which to entrain the air, and since in practice the apparatus may be used with varying liquid pressures it is advisable to take the highest likely pressure into account in determining the length of the tube. Too long a tube would, however, offer too much resistance to the forward flow and so result in a loss of power in the jet of foam produced. The length of the tube should be not less than four nor more than twelve times the diameter, and I prefer to make it between six and ten times the diameter.

The tube is preferably circular in cross-section, but may have some other cross-sectional shape if desired. In particular, if there are only two parallel jets a tube that is elliptical or of similar shape in cross-section must be used, since two parallel jets will not readily entrain the air in a tube of circular cross-section.

If a fire-fighting jet is to be produced a delivery nozzle may be directly connected to the end of the tube, but in general the foam is forced through a riser pipe or hose pipe or is introduced into the bottom of an oil tank, and in passing through such a riser pipe or hose pipe its quality is somewhat improved. This pipe is of greater diameter than the tube, in order to allow the foam to flow without meeting unnecessary resistance, and it is desirable to provide a flaring expansion chamber between the tube and the pipe.

In order to produce a powerful stream of foam the liquid must be delivered to the jet orifices at a high pressure and this should be at least 100 lbs. per square inch and is preferably 150 lbs. per square inch or more.

It is preferred to use a preformed solution of foam-stabilising compound in water, so that this is the liquid which is dilevered under pressure. However, it is within the invention to deliver water to the jet orifices and to cause the jets to entrain the foam-stabilising compound in liquid form into the parallel-sided tube.

Two apparatus according to the invention will now be described by way of example with reference to the accompanying drawings, in which:

Figure 1 shows a longitudinal section through one apparatus;

Figure 2 is a section on the line II—II in Figure 1; and

Figure 3 is a longitudinal section through part of the second apparatus.

The apparatus shown in Figures 1 and 2 consists essentially of a cylindrical casing 1 surrounding a cylindrical tube 2, a pipe union 3 at the inlet end, an orifice plate 4 held between the tube 2 and an internal flange in the pipe union 3, a flaring expansion chamber 5 and a hose connector 6. The orifice plate is formed with four jet orifices 7 which are tapered in the way usual when a high-velocity jet is to be produced and the axes of which are parallel to one another and to the axis of the tube 2. A baffle 8 in the form of a circular plate is fixed to a spigot 9 extending rearwardly from the orifice plate. In operation a solution of foam compound in water is introduced through the pipe union 3 under a high pressure and is split up into four parallel jets by the orifice plate. These jets emerge into the pipe 2 and flow down it as parallel jets. The baffle 8 imparts just enough turbulence to the liquid to ensure that the jets in the tube 2 scatter at the fringes so that at a little distance from the orifice plate the whole cross-sectional area of the tube is occupied by liquid with which air is intimately admixed. This air is drawn in through four circular openings 10 in the wall of the tube 2 and passes to these openings through openings 11 in the casing 1. The total area of the openings 11 is greater than that of the openings 10, and the total area of the openings 10 is greater than the cross-sectional area of the tube 2. Thus the cross-sectional area available for the passage of air is in effect the difference between the cross-sectional area of the tube and the total area of the jet orifices. Particularly satisfactory results have been found by a number of tests to be obtained with four parallel jet orifices, each 0.228 inch in diameter with their centres ¾ inch apart from one another, these jets discharging into a tube 1½ inches in diameter and 13½ inches long. It will be seen that in such an apparatus the ratio of the cross-sectional area of the jets is about 10:1, and the length of the tube is nine times the diameter of the tube.

In the modified apparatus shown in Figure 3 the parallel-sided tube is separated from the orifice plate and the air enters the open end of the tube instead of through openings in the wall of the tube. The tube is shown at 12 and is supported by a disc 13 through which rods 14 pass, these rods being carried in a plate 15 incorporating the orifice plate 4.

I claim:

1. An apparatus for use in producing air-foam comprising a pipe for connection to a source of liquid under pressure, an orifice plate shaped to provide a plurality of substantially parallel jets, the axes of the jet orifices being symmetrically arranged with respect to a line and being so arranged as not to intersect on the discharge side of said plate, a substantially parallel-sided non-converging tube of cross-sectional area from five to fifteen times the total cross-sectional area of the jet orifices arranged to receive the jets without previous contact of the liquid thereof with the air, said tube being disposed with its axis along said line and being so formed and arranged as to allow air to enter and be entrained by the jets, the length of the tube being from 4 to 12 times the diameter of the tube, and means in advance of said orifice plate for causing the liquid to flow radially inwardly toward the jet orifices and thereby imparting enough turbulence to the liquid to cause the jets to scatter at the fringes and to occupy the whole cross-section of the tube over part of its length.

2. An apparatus for use in producing air-foam comprising a pipe for connection to a source of liquid under pressure, an orifice plate shaped to provide a plurality of substantially parallel jets, the axes of the jet orifices being so arranged as not to intersect on the discharge side of said plate, a substantially parallel-sided non-converging tube of cross-sectional area from five to fifteen times the total cross-sectional area of the jet orifices, said tube being so disposed as to receive the jets directly without previous contact of the liquid with the air and so formed and arranged as to allow air to enter and be entrained by the jets within the same, the length of the tube being from 6 to 10 times the diameter of the tube, and means in advance of said orifice plate for causing the liquid to flow radially inwardly toward the jet orifices and thereby imparting enough turbulence to the liquid to cause the jets to scatter at the fringes and to occupy the whole cross-section of the tube over part of its length.

3. An apparatus for use in producing air-foam comprising a pipe for connection to a source of liquid under pressure, an orifice plate shaped to provide a plurality of substantially parallel jets, the axes of the jet orifices being so arranged as not to intersect on the discharge side of said plate, a substantially parallel-sided non-converging tube of cross-sectional area from five to fifteen times the total cross-sectional area of the jet orifices disposed in alinement with said orifices, said tube being so formed and arranged as to receive the jets directly without previous contact of the liquid thereof with the air and to allow air to enter and be entrained by the jets within the tube, the length of the tube being from 4 to 12 times the diameter of the tube, and means in advance of the jet orifices for causing the liquid to follow a tortuous path and for thereby imparting enough turbulence to the liquid to cause the jets to scatter at the fringes and to occupy the whole cross-section of the tube over part of its length, said means comprising a baffle disposed in the path of the liquid flowing to the jet orifices.

4. An apparatus for use in producing air-foam comprising a pipe for connection to a source of liquid under pressure, an orifice plate shaped to provide a plurality of substantially parallel jets, the axes of the jet orifices being so arranged as not to intersect on the discharge side of said plate, a substantially parallel-sided non-converging tube of cross-sectional area from five to fifteen times the total cross-sectional area of the jet orifices disposed in alinement with said orifices, said tube being so formed and arranged as to receive the jets directly without previous contact of the liquid thereof with the air and to allow air to enter and be entrained by the jets within the tubes, the length of the tube being from 4 to 12 times the diameter of the tube, means in advance of the jet orifices for causing the liquid to follow a tortuous path and for thereby imparting enough turbulence to the liquid to cause the jets to scatter at the fringes and to occupy the whole cross-section of the tube over part of its length, and a flaring tube connected with the discharge end of said first mentioned tube.

5. An apparatus for use in producing air-foam which comprises a pipe for connection to a source of liquid under pressure, means connected with said pipe for receiving liquid therefrom and projecting a plurality of substantially parallel jets of said liquid, the resulting jets being non-intersecting and arranged symmetrically about a common parallel line, limited turbulence producing means within said pipe in advance of said jet projecting means for causing the liquid in the pipe to deviate from stream line flow thereby to impart just sufficient turbulence to the liquid to cause the jets to scatter at the fringes, and a tubular member having its axis disposed along said common line and arranged to receive the parallel jets, said member having a single, unobstructed passage of a cross-sectional area between 5 and 15 times the combined cross-sectional areas of said jets arranged to receive all of said jets, the member being in communication with the atmosphere adjacent its jet receiving end for the aspiration of air by the action of said jets.

ARTHUR FERDINAND RATZER.

REFERENCES CITED

The following references are of record in the file of this patent:

UNITED STATES PATENTS

| Number | Name | Date |
| --- | --- | --- |
| 2,089,646 | Friedrich | Aug. 10, 1937 |
| 2,003,183 | Friedrich | May 28, 1935 |
| 2,373,009 | Bedford | Apr. 3, 1945 |
| 1,151,259 | Fischer | Aug. 24, 1915 |

FOREIGN PATENTS

| Number | Country | Date |
| --- | --- | --- |
| 491,838 | Great Britain | Sept. 9, 1938 |
| 658,328 | Germany | Mar. 26, 1938 |
| 435,979 | Great Britain | Oct. 2, 1935 |